United States Patent
Takemoto (10) Patent No.: US 6,806,911 B2
(45) Date of Patent: Oct. 19, 2004

(54) DISPLAY SYSTEM WITH SINGLE/DUAL IMAGE MODES

(75) Inventor: Naohiro Takemoto, Tokyo (JP)

(73) Assignee: NEC Corporation, Tokyo (JP)

( * ) Notice: Subject to any disclaimer, the term of this patent is extended or adjusted under 35 U.S.C. 154(b) by 415 days.

(21) Appl. No.: 09/871,436

(22) Filed: May 31, 2001

(65) Prior Publication Data

US 2001/0048482 A1 Dec. 6, 2001

(30) Foreign Application Priority Data

May 31, 2000 (JP) ........................................ 2000/161684

(51) Int. Cl.$^7$ .............................................. H04N 3/27
(52) U.S. Cl. ....................... 348/554; 348/588; 348/705
(58) Field of Search ............................... 348/554, 565, 348/588, 569, 706, 705

(56) References Cited

U.S. PATENT DOCUMENTS

| | | | |
|---|---|---|---|
| 5,148,275 A | * | 9/1992 | Blatter et al. ................ 358/147 |
| 5,432,561 A | * | 7/1995 | Strubbe ....................... 348/565 |
| 5,506,628 A | | 4/1996 | Chun |
| 5,729,300 A | | 3/1998 | Ahn |
| 5,760,842 A | * | 6/1998 | Song ........................... 348/564 |
| 6,011,594 A | * | 1/2000 | Takashima .................. 348/565 |
| 6,243,645 B1 | * | 6/2001 | Moteki et al. ............... 701/211 |
| 6,333,731 B1 | * | 12/2001 | Baek ........................... 345/115 |

FOREIGN PATENT DOCUMENTS

| | | |
|---|---|---|
| EP | 0 730 374 A2 | 9/1996 |
| JP | 58021981 A | 2/1983 |
| JP | 64-23282 | 1/1989 |
| JP | 05244450 A | 9/1993 |
| JP | 10069254 A | 3/1998 |
| JP | 10301522 A | 11/1998 |
| JP | 2000041196 A | 2/2000 |

* cited by examiner

*Primary Examiner*—Victor R. Kostak
(74) *Attorney, Agent, or Firm*—Choate, Hall & Stewart (57) ABSTRACT

A display system is provided, which makes it possible to switch automatically from a single image mode to a dual image mode, and vice versa, without input of any switching signal. When an image is displayed on the screen of the display device in the single image mode according to the first video input sent through the first input line, the first detector outputs the first detection signal. Thereafter, if the second detector detects the synchronizing signal of the second video input sent through the second input line, the second detector outputs the second detection signal. This means that the switch receives both of the first and second detection signals in this state. As a result, the switch selects the dual image mode and accordingly, the two images are simultaneously displayed on the screen of the display device.

6 Claims, 5 Drawing Sheets

DISPLAY SYSTEM WITH SINGLE/DUAL IMAGE MODES

BACKGROUND OF THE INVENTION

1. Field of the Invention

The present invention relates to a display system capable of displaying images in the single and dual image modes and more particularly, to a display system that switches automatically from the single image mode to the dual image mode, and vice versa.

2. Description of the Related Art

Conventionally, display systems capable of displaying images in the dual image mode where two images are simultaneously displayed on the same screen are known. An example of the systems of this type is disclosed in the Japanese Non-Examined Patent Publication No. 58-21981 published in 1983. In this system, a television (TV) picture tube having the dual image mode is used. Usually, an ordinary TV program is displayed in a larger display area on the screen of the tube while a piece of information (e.g., an acceptance or reception number) sent from a computer is displayed in a smaller display area on the same screen, The smaller display area is designed for displaying a competing TV program on a different channel from the larger display area.

When the user presses an operating button connected to the computer, a switching signal is sent to the system from the computer, thereby switching the image in the larger display area with the image in the smaller display area, and vice versa. Specifically, another piece of information (e.g., another acceptance or reception number) sent from the computer is displayed on the larger display area while the TV program is displayed on the smaller display area. After a specific period of time passes, the images on the larger and smaller areas are replaced with each other, returning to the original display state.

With the conventional display system disclosed in the Publication No. 58-21981, as explained above, the larger and smaller display areas are always formed on the screen of the TV picture tube and therefore, there is a disadvantage that the smaller area is kept blank (e.g., blue back) when there is no information to be displayed on the smaller area.

To avoid this advantage, the dual image display function may be activated only within a necessary period of time. Specifically, when the user presses the operation button, a specific switching signal is sent from the computer to the TV tube, thereby switching the display state on the screen from the single image mode to the dual image mode. In this case, a piece or information from the computer is displayed on the smaller area while the TV program is displayed on the larger area.

However, with the display system where the dual image display function is activated or switched only within a necessary period of time, a specific switching signal needs to be inputted into the TV picture tube. Thus, when video information is sent to the tube from an input device such as a Video Cassette Recorder (VCR) instead of the TV programs, a controller for generating the switching signal is required. Also, proper connection terminals for the switching signal need to be mounted on the system and at the same time, the terminals need to be connected to a circuit for decoding the switching signal and for switching the state of the screen between the single and dual image modes.

Moreover, the controller and the tube need to be connected with each other by way of a cable dedicated to the switching signal in addition to connection of ordinary video cables. This makes the configuration of the system complicated and the connectable distance limited.

On the other hand, the Japanese Non-Examined Patent Publication No. 2000-41196 published in February 2000 discloses a technique for detecting the existence and absence of the synchronizing signal of video inputs supplied through a plurality of input lines in a TV picture tube. In this technique when the video input contains a synchronizing signal, Information for representing the images being displayable is displayed on the screen of the tube. When the video input contains no synchronizing signal, information for representing the images being non-displayable is displayed on the screen.

With the technique disclosed in the Publication No. 2000-41196, the user recognizes which video inputs arc displayable and non-displayable from the content pf the information displayed on the screen. Therefore, the user can skip the non-displayable inputs. This means that the user can choose a desired one of the inputs while decreasing the necessary number of operations.

A technique to judge whether or not images are displayable on the screen by detecting a synchronizing signal in the video input is disclosed in, for example, the Japanese Non-Examined Patent Publication Nos. 64-23282 published in 1929, 5-244450 published in 1993, 10-69254 published in 1998, and 10-301522 published in 1998.

By the way, the Publication No. 2000-41196 does not disclose the technique about the switching operation between the single image mode and the dual image mode. However, supposing that the switching operation be incorporated into the technique, the technique will be modified in the following way.

The existence and absence of the synchronizing signal of video signals supplied through a plurality of video inputs is detected in a TV picture tube. When the video input contains a synchronizing signal, information for representing their images being displayable is displayed on the screen or the tube When the video input contains no synchronizing signal, information for representing the images being non-displayable is displayed on the same screen. Moreover, when two ones of the inputs having displayable images are selected, the images sent through the two inputs are displayed on the screen in the dual mode. When only one of the inputs having displayable images is selected, the images sent through the input are displayed on the screen in the single mode.

In this modified technique, the selection and indication of the desired video inputs need to be conducted by the user himself as necessary. This leans that the switching operation between the single and dual image modes would be not carried out automatically

SUMMARY OF THE INVENTION

Accordingly, an object of the present invention is to provide a display system that makes it possible to switch automatically from the single image mode to the dual image mode, and vice versa.

Another object of the present invention is to provide a display system that makes it possible to switch from the single image mode to the dual image mode without input of any switching signal, and vice versa.

The above objects together with others not specifically mentioned will become clear to those skilled in the art from the following description.

According to a first aspect of the present invention, a display system is provided. This system comprises.

(a) a first detector for detecting a synchronizing signal of a first video input sent through a first input line;

the first detector outputting a first detection signal when the synchronizing signal of the first video input is detected;

(b) a second detector for detecting a synchronizing signal of a second video input sent through a second input line;

the second detector outputting a second detection signal when the synchronizing signal of the second video input is detected;

(c) a switch for selecting one of a single image mode and a dual image mode;

the switch selecting the single image mode when receiving one of the first detection signal outputted from the first detector and the second detection signal outputted from he second detector, thereby producing a first output signal;

the first output signal corresponding to one of the first video input and the second video input received by the switch;

the switch selecting the dual image mode when receiving both of the first detection signal outputted from the first detector and the second detection signal outputted from the second detector, thereby producing a second output signal;

the second output signal corresponding to both of the first video input and the second video input received by the switch; and (d) a display device for displaying an image according to the first or second video input on a screen in the single image mode and two images according to the first and second video inputs on the screen in the dual image mode.

With the display system according to the first aspect of the present invention, for example, it is supposed that an image is displayed on the screen of the display device in the single image mode according to the first video input sent through the first input line. At this time, the first detector outputs the first detection signal. Thereafter, if the second detector detects the synchronizing signal of the second video input sent thorough the second input line, the second detector outputs the second detection signal This means that the switch receives both of the first and second detection signals in this state. As a result, the switch selects the dual image mode and accordingly, the two images are simultaneously displayed on the screen of the display device according to the first and second video inputs.

As explained above, because of the detection of the synchronizing signal of the second video input by the second detector, the display device is automatically turned to the dual image mode from the single image mode. If the synchronizing signal of the second video input disappears in this state, the display device is automatically turned to the single image mode from the dual image mode, thereby displaying only the image according to the first video input sent through the first input line.

Thus, the display device can be switched automatically from the single image mode to the dual image mode, and vice versa. This switching operation does not require the input of any switching signal.

In a preferred embodiment of the display system according to the first aspect, each of the synchronizing signals of the first and second video inputs is a pulsed signal. When the pulsed signal is not observed within a specific period of time, each of the first and second detectors judges that each of the first and second video inputs does not include the corresponding synchronizing signal.

In another preferred embodiment of the display system according to the first aspect, each of the synchronizing Signals of the first and second video inputs is a pulsed signal. When the pulsed signal observed within a specific period of time has a frequency apart sufficiently from an available frequency of the display device, each of the first and second detectors judges that each of the first and second video inputs does not include the corresponding synchronizing signal.

According to a second aspect of the present invention another display system is provided. This system comprises (a) an input line selector for selecting two ones of n input lines as a first input line and a second input line, where n is an integer equal to or greater than 3;

(b) a first detector for detecting a synchronizing signal of a first video input sent through the first input line;

the first detector outputting a first detection signal when the synchronizing signal of the first video input is detected;

(c) a second detector for detecting a synchronizing signal of a second video input sent through the second input line;

the second detector outputting a second detection signal when the synchronizing signal of the second video input is detected;

(d) a switch for selecting one of a single image mode and a dual image mode;

the switch selecting the single image mode when receiving one of the first detection signal outputted from the first detector and the second detection signal outputted from the second detector, thereby producing a first output signal;

the first output signal corresponding to one of the first video input and the second video input received by the switch;

the switch selecting the dual image mode when receiving both of the first detection signal outputted from the first detector and the second detection signal outputted from the second detector, thereby producing a second output signal;

the second output signal corresponding to both of the first video input and the second video input received by the switch; and (e) a display device for displaying an image according to the first or second video input on a screen in the single image mode and two images according to the first and second video inputs on the screen in the dual image mode.

With the display system according to the second aspect of the present invention, the input line selector selects two ones of the n input lines as the first and second input lines. The other configuration and operation are substantially the same as those of the display system according to the first aspect. As a result, there are the same advantages as those of the system according to the first aspect.

In a preferred embodiment of the display system according to the second aspect, each of the synchronizing signals of the first and second video inputs is a pulsed signal When the pulsed signal is not observed within a specific period of time, each of the first and second detectors judges that each of the first and second video inputs does not include the corresponding synchronizing signal.

In another preferred embodiment of the display system according to the second aspect, each of the synchronizing signals of the first and second video inputs is a pulsed signal then the pulsed signal observed within a specific period of time has a frequency apart sufficiently from an available frequency of the display device, each of the first and second detectors judges that each of the first and second video inputs does not include the corresponding synchronizing signal.

BRIEF DESCRIPTION OF THE DRAWINGS

In order that the present invention may be readily carried into affect, it will now be described with reference to the accompanying drawings.

DETAILED DESCRIPTION OF THE PREFERRED EMBODIMENTS

Preferred embodiments of the present invention will be described in detail below while referring to the drawings attached.

First Embodiment

Figure 1:
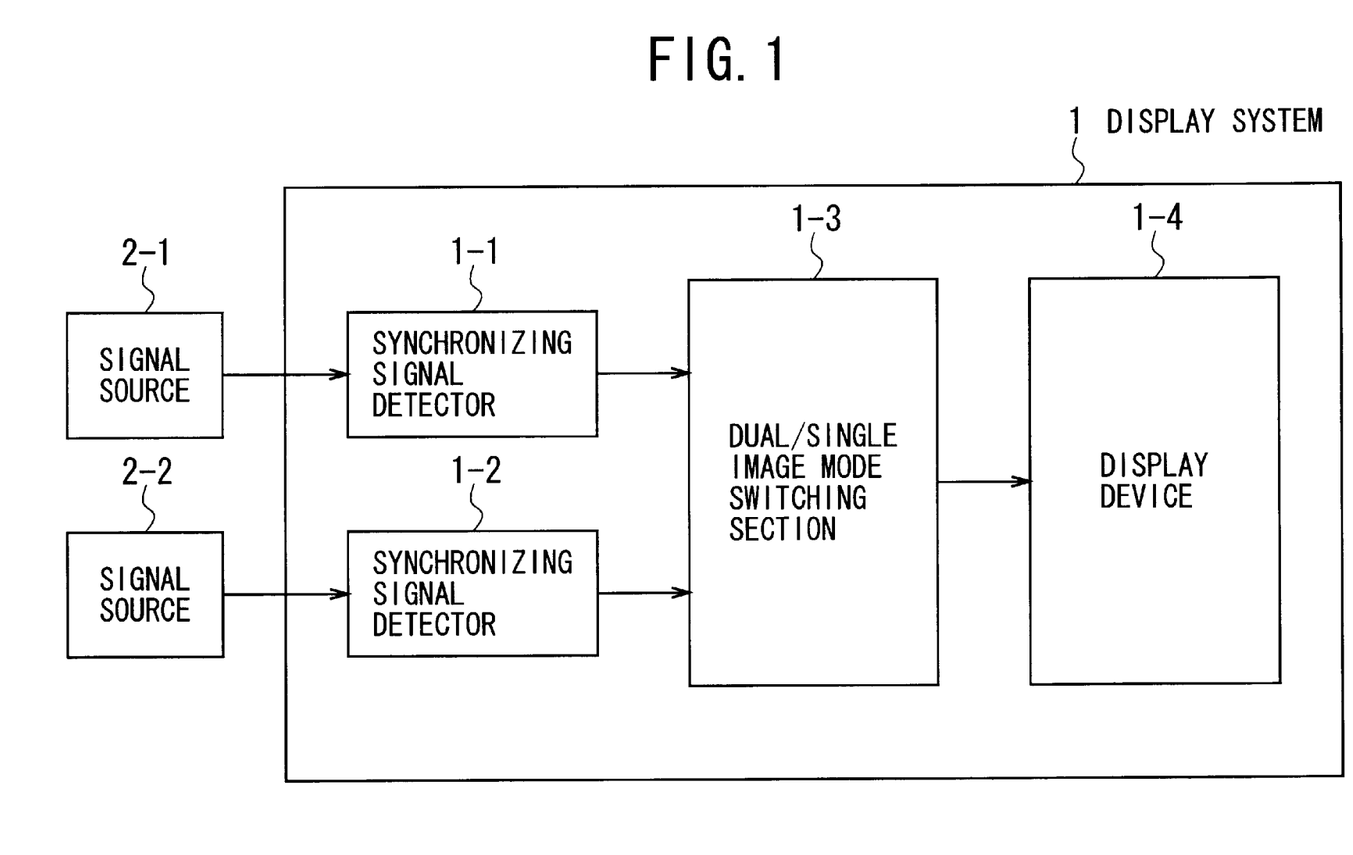
FIG. 1 is a functional block diagram showing the schematic configuration of a display system according to a first embodiment of the invention.

The configuration of a display system 1 according to a first embodiment of the invention is schematically shown in FIG. 1.

In FIG. 1, the display system 1 comprises first and second synchronizing signal detectors 1-1 and 1-2, a dual/single image mode switching section 1-3, and a display device 1-4.

A first signal source 2-1 provides a first video input to the display system 1. The first video input of the source 2-1, which contains a video signal and a synchronizing signal, constitutes the "first input line". A second signal source 2-2 provides a second video input to the display system 1. The second video input of the source 2-2, which contains a video signal and a synchronizing signal, constitutes the "second input line". The first and second video inputs are applied to the first and second detectors 1-1 and 1-2, respectively.

The first detector 1-1 detects whether or not the first video input sent through the first input line contains the synchronizing signal. Then, the detector 1-1 outputs a first detection result signal to the switching section 1-3. The first detection result signal includes information that the first video input contains the synchronizing signal or not.

The second detector 1-2 detects whether or not the second video input sent through the second input line contains the synchronizing signal. Then, the detector 1-2 outputs a second detection result signal to the switching section 1-3. The second detection result signal includes information that the second video input contains the synchronizing signal or not.

Figure 2A:
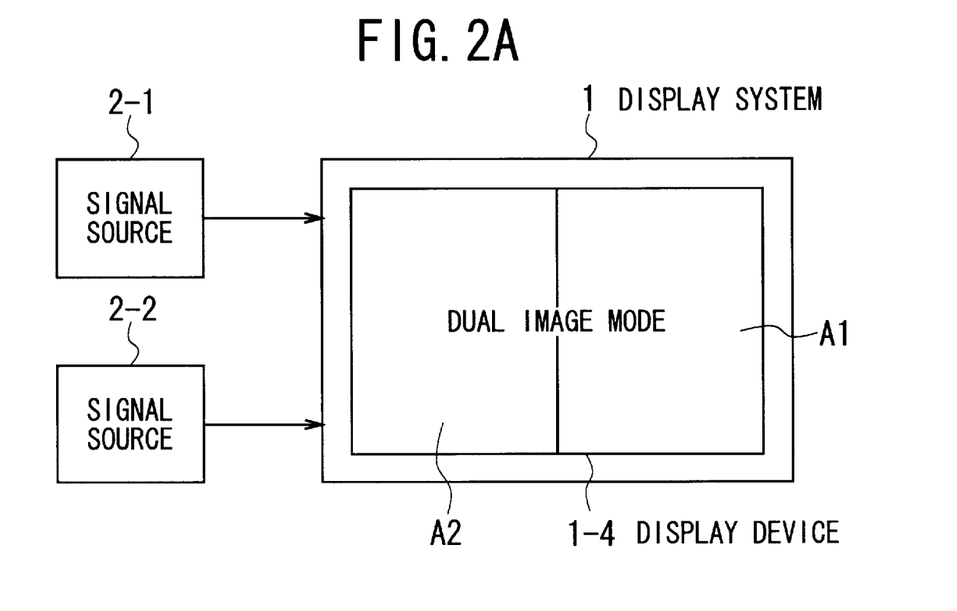
FIG. 2A is a schematic illustration showing the dual-mode display operation of the system according to the first embodiment of FIG. 1.

When the first detection result signal includes the information that the first video input contains the synchronizing signal and the second detection result signal includes the information that the second video input contains she synchronizing signal, the dual/single image mode switching section 1-3 outputs a video signal for the two image mode to the display device 1-4. In this case, two images A1 and A2 are simultaneously displayed on the screen of the device 1-4 according to the first and second video inputs, as shown in FIG. 2A.

Figure 2B:
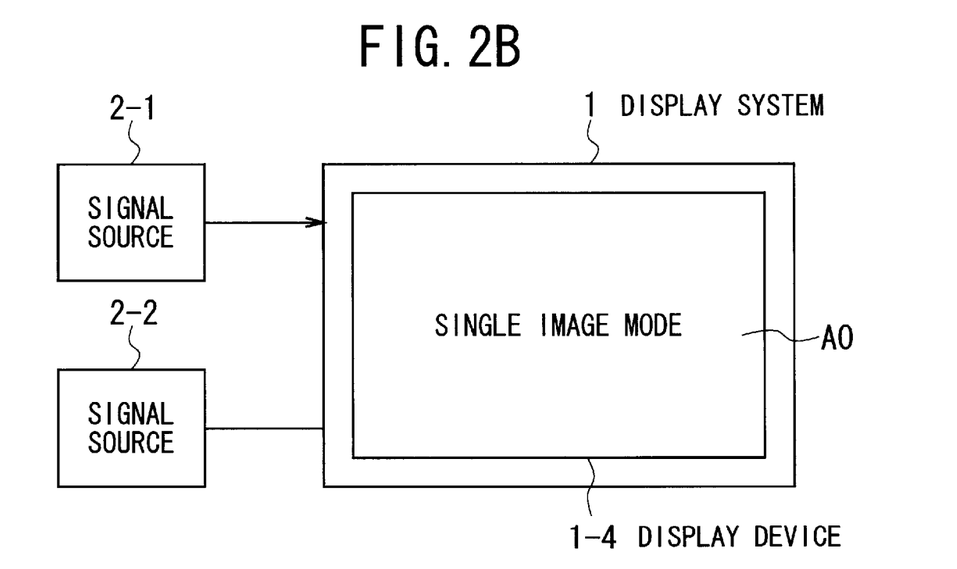
FIG. 2B is a schematic illustration showing the single-mode display operation of the system according to the first embodiment of FIG. 1.

When either of the first and second detection result signals does not include the information that the first or second video input contains the synchronizing signal, the dual/single image mode switching section 1-3 outputs a video signal for the single image mode to the display device 1-4. In this case, a single image A0 is displayed on the screen according to a corresponding one of the first and second video inputs, as shown in FIG. 2B.

As explained above, with the display systems 1 according to the first embodiment of FIG. 1, each of the first and second detectors 1-1 and 1-2 detects whether or not the first or second video input includes the synchronizing signal. Then, based on the detection result thus obtained, the dual and single image modes are automatically switched to each other on the display device 1-4. Therefore, the switching operation between the dual and single image modes can be conducted even if an external switching signal is not applied to the system 1. This means that a control device for generating the external switching signal is unnecessary.

Also, there is no need to mount connection terminals for the external switching signal sent from the control device. This means that a decoding/controlling circuit for decoding the external switching signal and controlling the same is not needed. Since no additional cable is required for supplying the external switching signal to the system 1, the problem that the connection is complicated and the connectable distance is limited does not occur

Second Embodiment

Figure 3:
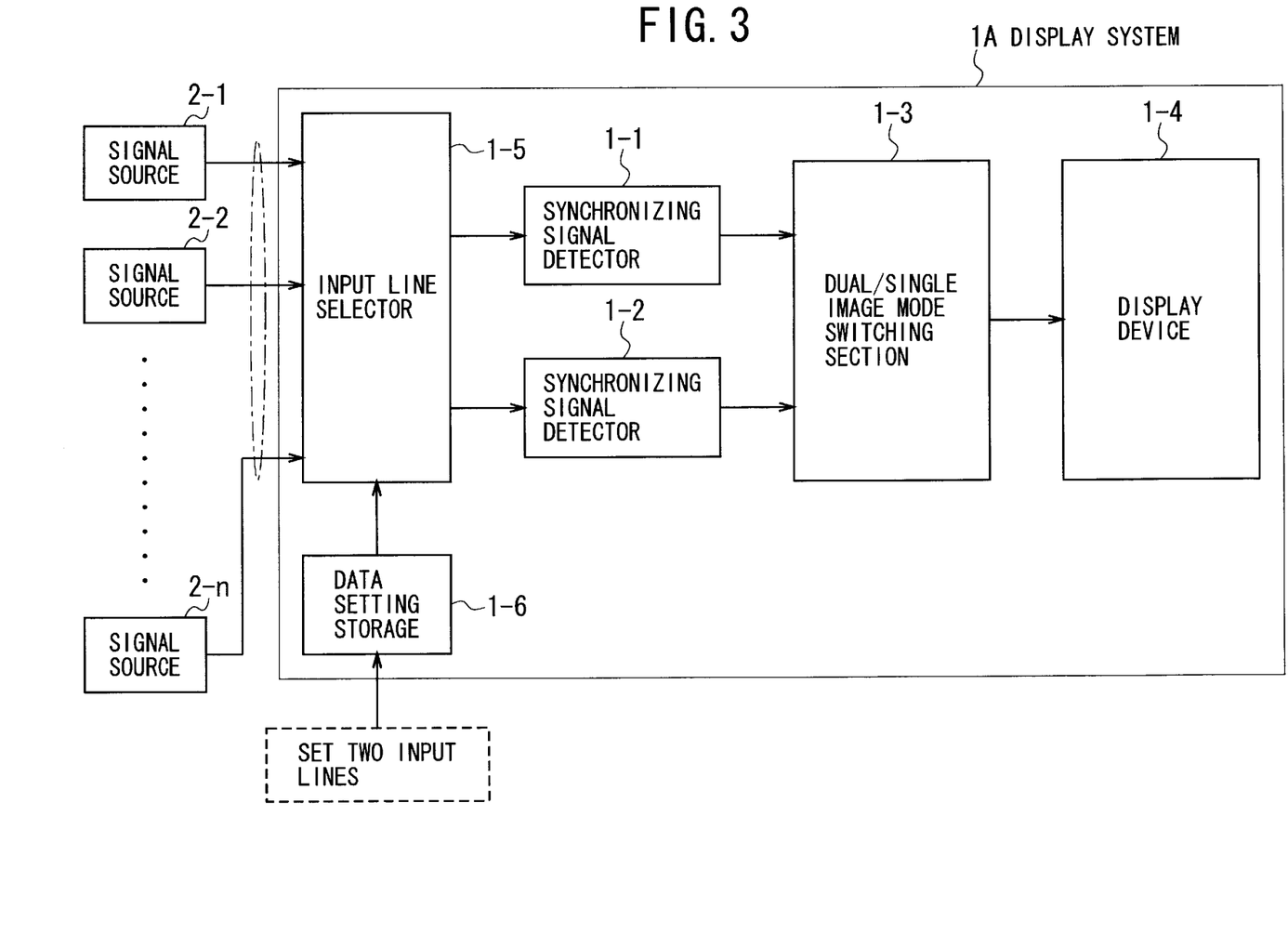
FIG. 3 is a functional block diagram showing the schematic configuration of a display system according to a second embodiment of the invention.

The configuration of a display system 1A according to a second embodiment of the invention is schematically shown in FIG. 3. The system 1A has a configuration obtained by adding an input line selector 1-5 and a data setting storage 1-6 to the configuration of the display system 1 of the first embodiment. Therefore, the explanation about the same configuration as the system 1 is omitted here for simplification of description.

The input line selector 1-5 selects two ones of first to n-th signal sources 2-1 to 2-n, where n is an integer equal to or greater than 3 (n≧3). The selector 1-5 outputs these two sources as the first and second input lines to the first and second synchronizing signal detectors 1-1 and 1-2, respectively. For example, the selector 1-5 selects the first and second sources 2-1 and 2-2 and outputs them as the first and second input lines, respectively.

The selection of the signal sources 2-1 to 2-n in the selector 1-5 is carried out according to the setting or selection condition stored in the data setting storage 1-6. The setting or selection condition for the two ones of the sources 2-1 to 2-n is determined by the user.

The first synchronizing signal detector 1-1 detects whether or not the first video input sent through the first input line (e.g., the first signal source 2-1) contains the synchronizing signal. Then, the detector 1-1 outputs the first detection result signal to the switching section 1-3 The first detection result signal includes information that she first video input contains the synchronizing signal or not.

The second synchronizing signal detector 1-2 detects whether or not the second video input sent through the second input line (e.g., the second signal source 2-2) contains the synchronizing signal. Then, the detector 1-2 outputs he second detection result signal to the switching section 1-3. The second detection result signal includes information that the second video input contains the synchronizing signal or not.

When the first detection result signal includes the information that the first video input contains the synchronizing signal and the second detection result signal includes the information that the second video input contains the synchronizing signal, the dual/single image mode switch section 1-3 outputs a video signal for the two image mode to the display device 1-4. In this case, two images A1 and A2 are simultaneously displayed on the screen of the device 1-4 according to the first and second video inputs, as shown in FIG. 2A.

When either of the first and second detection result signals does not include the information that the first or second video input contains the synchronizing signal, the dual/single image mode switch section 1-3 outputs a video signal for the single image mode to the display device 1-4. In this case, a single image A0 is displayed on the screen according to a corresponding one of the first and second video inputs, as shown in FIG. 2B.

As explained above, with the display system 1A according to the second embodiment of FIG. 3, because of the same reason as shown in the first embodiment, the same advantages as those in the first embodiment are given.

In addition, in the system 1A of the second embodiment, the selection from the input signal sources 2-1 to 2-n is conducted by the user himself/herself and the data about the input signal selection is stored in the storage 1-6. The input line selector 1-5 conducts its operation automatically according to the user's input signal selection stored in the storage 1-6. As a result, unlike the technique derived from the Japanese Non-Examined Patent Publication No. 2000-41196 described previously, the selection operation between the dual and single image nodes is not required on the screen of the display device 1-4 each time.

Third Embodiment

Figure 4:
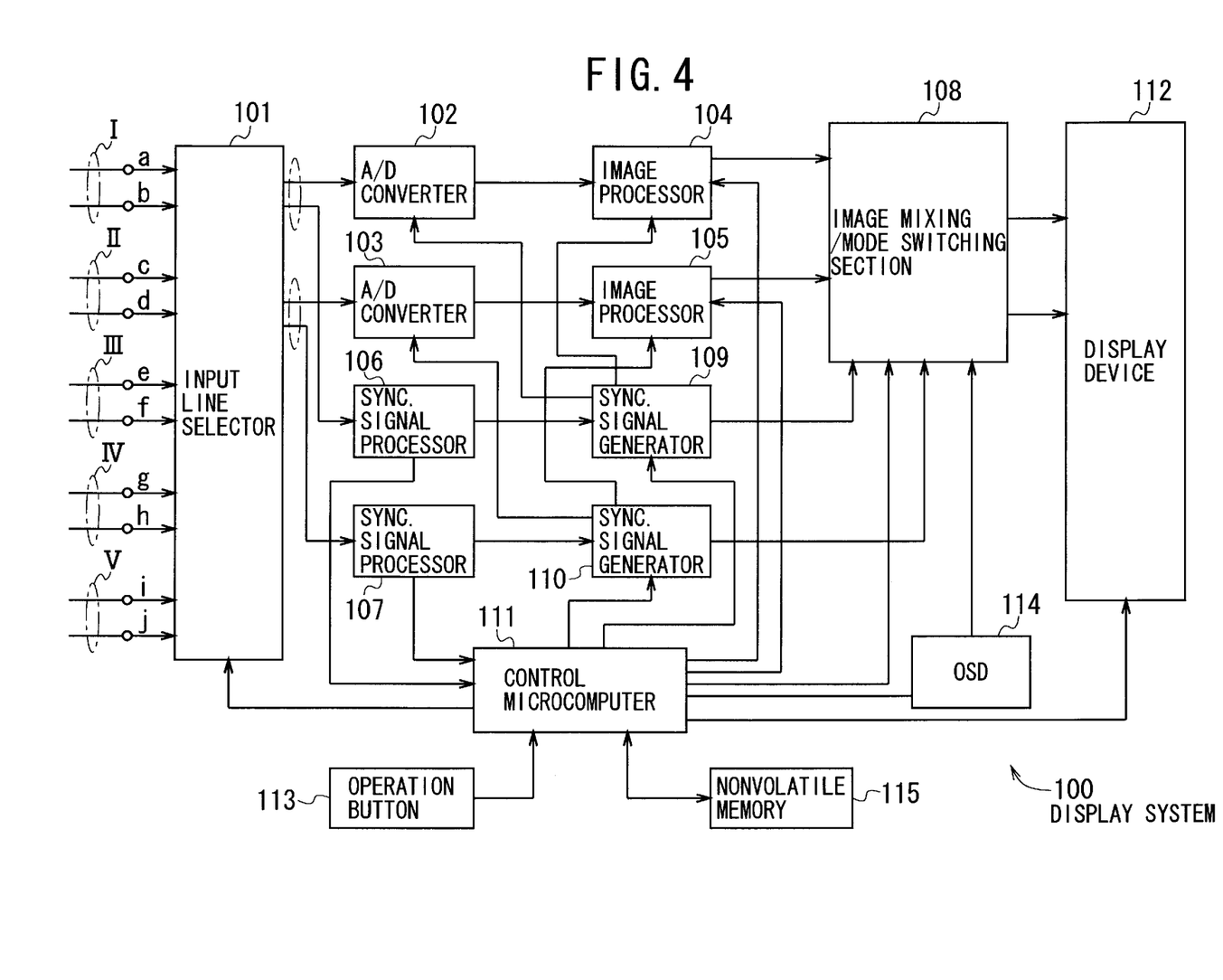
FIG. 4 is a functional block diagram showing the schematic configuration of a display system according to a third embodiment of the invention, which corresponds to a concrete example of the second embodiment of FIG. 3.

FIG. 4 shows a display system 100 according to a third embodiment of the invention, which corresponds to a concreted example of the display system 1A according to the second embodiment of FIG. 3.

The display system 100 comprises an input line selector 101, two Analog-to-Digital (A/D) converters 102 and 103, two image processors 104 and 105, two synchronizing signal processors 106 and 107, an image mixing/mode switching section 108, two synchronizing signal generators 109 and 110, a control microcomputer 111, a display device 112, an operation button 113, an on-screen device (OSD) 114, and a nonvolatile memory 115.

The system 100 has five video signal terminals a, c, e, g, and i and five synchronizing signal terminals b, d, f, h, and j. The video and synchronizing signals for an input line I are applied to the input line selector 101 through the terminals a and b, respectively similarly, the video and synchronizing signals for an input line II are applied to the selector 101 through the terminals c and d, respectively. The video and synchronizing signals for an input line III are applied to the selector 101 through the terminals e and f, respectively. The video and synchronizing signals for an input line IV are applied to the selector 101 through the terminals g and h, respectively. The video and synchronizing signals for an input line V are applied to the selector 101 through the terminals i and j, respectively.

The selector 101 selects two ones of the five input lines I to V and outputs them as the first and second input lines according to the user's selection data sent from the microcomputer 111.

The A/D converter 102 receives the analog video signal of the first input line (i.e., the first video input) and converts it to a digital video signal. The converter 102 outputs the digital video signal thus produced to the image processor 104. The A/D converter 103 receives the analog video signal of the second input line (i.e., the second video input) and converts it to a digital video signal. The converter 103 outputs the digital video signal thus produced to the image processor 105.

The image processor 104 conducts its image processing operation (e.g. resolution conversion and enlargement/shrinkage of images) for the digital video signal of the first input line sent from the A/D converter 102. The image processor 105 conducts its image processing operation (e.g., resolution conversion and enlargement/shrinkage or images) for the digital video signal of the second input line sent from the A/D converter 103.

The image mixing/mode switching section 108 receives the digital video signals subjected to the specific image processing in the image processors 104 and 105. Then, the section 108 conducts a specific image mixing operation of these video signals and/or a switching operation between the dual image mode and the single image mode. The section 108 sends its output signal to the display device 112.

The synchronizing signal processor 106 receives the synchronizing signal of the first input line and then, detects the polarity of the signal and adjusts its polarity and level. The processor 106 sends the synchronizing signal thus processed to the synchronizing signal generator 109 and the microcomputer 111. Also, the processor 106 sends the polarity detection information on the synchronizing signal to the microcomputer 111.

The synchronizing signal processor 107 receives the synchronizing signal of the second input line and then, detects the polarity of the signal and adjusts its polarity and level. The processor 107 sends the synchronizing signal thus processed to the synchronizing signal generator 110 and the microcomputer 111. Also, the processor 107 sends the polarity detection information on the synchronizing signal to the microcomputer 111.

The synchronizing signal generator 109 generates the sampling clock for the A/D converter 102 and the synchronizing signals for the image processor 104, the image mixing/mode switching section 108, and the display device 112. The synchronizing signal generator 110 generates the sampling clock for the A/D converter 103 and the synchronizing signals for the image processor 105, the image mixing/mode switching section 108, and the display device 112.

The microcomputer 111 or controlling the whole operation of the system 100 outputs the setting information to the image processors 104 and 105, thereby optimizing the image processing operation to the digital video signals from the A/D converters 102 and 103. The microcomputer 111 outputs the setting information to the synchronizing signal generators 109 and 110, thereby optimizing the timing of the sampling clocks to the A/D converters 102 and 102 and the synchronizing signals to the image processors 104 and 105. Moreover, the microcomputer 111 outputs the setting information to the display device 112, thereby optimizing the operation of the device 112. The microcomputer 111 outputs the setting information to the image mixing/mode switching section 108, thereby mixing the two images applied through the first and second input lines to form a single image on the screen of the device 112 and/or switching the single and dual image modes. The microcomputer 111 conducts its operation according to a program stored in an internal memory (not shown).

The nonvolatile memory 115 stores the setting information about the switching method and the selected input line or lines. Specifically, the memory 115 stores the information about whether the switching operation between the single and dual image modes is carried out automatically or manually, and about which one/ones of the five input lines I to V is/are selected and inputted.

The storing operation of the setting information into the memory 115 and the changing operation for the same are conducted by the user by way of the operation button 113. The OSD 114 is provided between the microcomputer 111 and the image mixing/mode switching section 108 in such a way that the user recognizes in real time what operation he or she is doing and how he or she is conducting the operation.

Setting by the User

The user operates the button 113 to make the setting information about (i) whether the switching operation between the single and dual image modes is carried out automatically or manually, and (ii) which one or ones of the five input lines I to V is/are selected and inputted for the single or dual image mode. The setting information is inputted into the microcomputer 111. Thereafter, the microcomputer 111 sends the setting information to the OSD 114, thereby displaying the content of the information on the screen of the display device 112 in the form of menu. Also, the microcomputer 111 stores the setting information into the nonvolatile memory 115.

Automatic Image Mode Switching

The microcomputer 111 judges which one of the automatic and manual mode-switching operations the user instructs from the setting information stored in the nonvolatile memory 115. When the automatic switching operation is instructed, the microcomputer 111 reads out the information about which ones of the five input lines I to V are selected for the dual image mode and then, sends the information to the input line selector 101. In response to the information, the selector 101 selects two ones of the input lines I to V as the first and second input lines. For example, the input lines I and II are selected as the first and second input lines, respectively.

The video signal and the synchronizing signal of the first input line are applied to the A/D converter 102 and the synchronizing signal processor 106, respectively. The video signal and the synchronizing signal of the second input line are applied to the A/D converter 103 and the synchronizing signal processor 107, respectively.

The synchronizing signal processor 106 detects the polarity of the synchronizing signal of the first input line and adjusts its polarity and level. Then, the processor 106 sends the synchronizing signal thus processed and the polarity detection information thereon to the microcomputer 111. The synchronizing signal processor 107 detects the polarity of the synchronizing signal of the second input line and adjusts its polarity and level. Then, the processor 107 sends the synchronizing signal thus processed and the polarity detection information thereon to the microcomputer 111.

Each of the synchronizing signals of the video signals of the first and second input lines is a pulsed signal. When the pulsed signal is not observed within a specific period of time, the microcomputer 111 judges that each of the video signals does not include the corresponding synchronizing signal. Alternately, when the pulsed signal observed within a specific period of time has a frequency apart sufficiently from an available frequency of the display device 112, the microcomputer 111 judges that each of the video signals does not include the corresponding synchronizing signal as well. "A frequency apart sufficiently from an available frequency of the display device 112" is defined, for example, as a frequency that does not allow the device 112 to display any images on its screen due to asynchronism.

Here, as an example, it is supposed that the display device 112 has an available resolution termed the "UXGA" with a horizontal resolution of 1600 and a vertical resolution of 1200, that a horizontal synchronizing frequency Hs ranges from 15.6 kHz to 108.5 kHz, and that a vertical synchronizing frequency Vs ranges from 50 Hz to 120 Hz. In this case, the microcomputer 111 judges that each of the video signals does not include the corresponding synchronizing signal, when the horizontal synchronizing frequency Hs is equal to or less than 10 kHz (i.e., Hs≦10 kHz) or equal to or greater than 115 kHz (i.e., Hs≧115 kHz) and/or the vertical synchronizing frequency Vs is equal to or less than 25 Hz (i.e., Vs≦25 Hz) or equal to or greater than 130 Hz (i.e., Vs≧130 Hz).

When the pulsed signal is observed within a specific period of time and at the same time, the pulsed signal observed within the specific period has a frequency that is not apart from an available frequency of the display device 112 largely, the microcomputer 111 judges that each of the video signals includes the corresponding synchronizing signal.

When the microcomputer 111 judges that both of the synchronizing signals from the first and second input lines to the synchronizing signal processors 106 and 107 exist, the microcomputer 111 sends an instruction of switch the display operation of the display device 112 to the dual image mode. Then, the two images sent through the first and second input lines (i.e., the two image signals outputted from the image processors 104 and 105) are simultaneously displayed on the screen of the device 112, as shown in FIG. 2A.

When the microcomputer 111 judges that the synchronizing signal through tho first input line to the synchronizing signal processor 106 does not exist while the synchronizing signal through the second input line to the synchronizing signal processor 107 exists, the microcomputer 111 sends an instruction to switch the display operation of the display device 112 to the single image mode. Then, the image sent through the second input line (i.e., the image signal outputted from the image processor 105) is displayed on the screen of the device 112, as shown in FIG. 2B.

When the microcomputer 111 judges that the synchronizing signal through the first input line to the synchronizing signal processor 106 exists while the synchronizing signal through the second input line to the synchronizing signal processor 107 does not exist, the microcomputer 111 sends an instruction to switch the display operation of the display device 112 to the single image mode. Then, the image sent through the first input line (i.e., the image signal outputted from the image processor 104) is displayed on the screen of the device 112, as shown in FIG. 2B.

Additionally, when the microcomputer 111 judges that none of the synchronizing signals through the first and second input lines to the synchronizing signal processors 106 and 107 exist, the microcomputer 111 sends an instruction to switch the display operation of the display device 112 to the silence mode to the synchronizing signal generators 109 and 110. In this case, the synchronizing signals applied to the A/D converters 102 and 103, the image processors 104 and 105, the image mixing/mode switching section 108, and the display device 112 are kept alive. Thus, there is no possibility that disorder of images on the screen of the device 112 and unstable operation of the device 112 itself occur because of lack of the synchronizing signal.

In the silence mode, the video signals applied to the A/D converters 102 and 103 and the image processors 104 and 105 include no signal component or include abnormal signal components (i.e., unsynchronized components). Therefore, the microcomputer 111 controls the image mixing/mode switching section 108 in such a way that the section 108 outputs a synchronized black or gray video signal to the display device 112 instead of the video signals applied through the first and second input lines. This means that a "video muting process" is applied to the screen of the device 112.

Alternately, the switching section 108 is controlled to output a synchronized blue video signal to the display signal 112 instead of the video signals applied through the first and second input lines. This means that a "blue back process" is applied to the screen of the device 112.

If some difference in brightness and/or tint or color tone occurs between the two image areas on the screen of the device 112 in the dual image mode, the operation of the device 112 may be switched to the single image mode to display a single image based on either of the two silent signals. This may be carried out by instruction from the microcomputer 111 to the section 108.

Video Signals after A/D Conversion

The video signals applied through the first and second input lines are inputted into the A/D converters 102 and 103, respectively. Then, they are converted to the digital signals with the use of the sampling clocks generated by the Phase-Locked Loop (PLL) circuits in the synchronizing signal generators 109 and 110, respectively. The digital video signals thus generated are subjected to the resolution conversion process and/or the enlarging/shrinking process In the image processors 104 and 105, respectively, thereby adapting them to display on the screen in the single or dual image mode. These video images thus adapted are displayed on the screen of the device 112 in the single or dual mode according to the control of the section 108.

The resolution conversion process and/or the enlarging/shrinking process in the image processors 104 and 105, the image miring and mode switching processes in the image mixing/mode switching section 108, and the operation of the display device 112 are controlled by the control information generated and sent by the microcomputer 111. The control information are generated by the microcomputer 111 according to the input video signals through the first and second input lines.

The synchronizing signals generated by the synchronizing signal generators 109 and 110 are generated to have suitable timing to the single or dual image mode with respect to the input video signals. These signals thus generated are respectively outputted to the image processors 104 and 105, the image mixing/mode switching section 108, and the display device 112 at their individual time schedules. The operation of the signal generators 109 and 110 is controlled by the information outputted from the microcomputer 111 corresponding to the input signals.

The type of the input signals is judged by counting the frequency with the use of the synchronizing signals outputted from the synchronizing signal processors 106 and 107. Alternately, the microcomputer 111 receives the polarity detection signals of the synchronizing signals generated by the processors 106 and 107 and then, the microcomputer 111 compares the values of the polarity detection signals with the peculiar values stored in the internal memory of the microcomputer 111, thereby judging the type of the input signals.

For example, with the VGA video signal having a refresh rate of 60 Hz, the following peculiar information is stored in advance in the internal memory of the microcomputer 111.

Horizontal resolution: 640

Vertical resolution: 480

Horizontal Synchronizing Frequency: 31.47 kHz±several kHz

Vertical Synchronizing Frequency: 60 Hz±several HZ

Horizontal Synchronizing Polarity: negative

Vertical Synchronizing Polarity: negative

With the SVGA video signal having a refresh rate of 75 Hz, the following peculiar information is stored in advance in the internal memory of the microcomputer 111.

Horizontal resolution: 800

Vertical resolution: 600

Horizontal Synchronizing Frequency: 46.8 kHz±several kHz

Vertical Synchronizing Frequency; 75 Hz±several Hz

Horizontal Synchronizing Polarity: positive

Vertical Synchronizing Polarity: positive

As explained above, with the display system 100 according to the third embodiment of FIG. 4, because of the same reason as shown in the first embodiment, the same advantages as those in the first embodiment are given.

Fourth Embodiment

Figure 5:
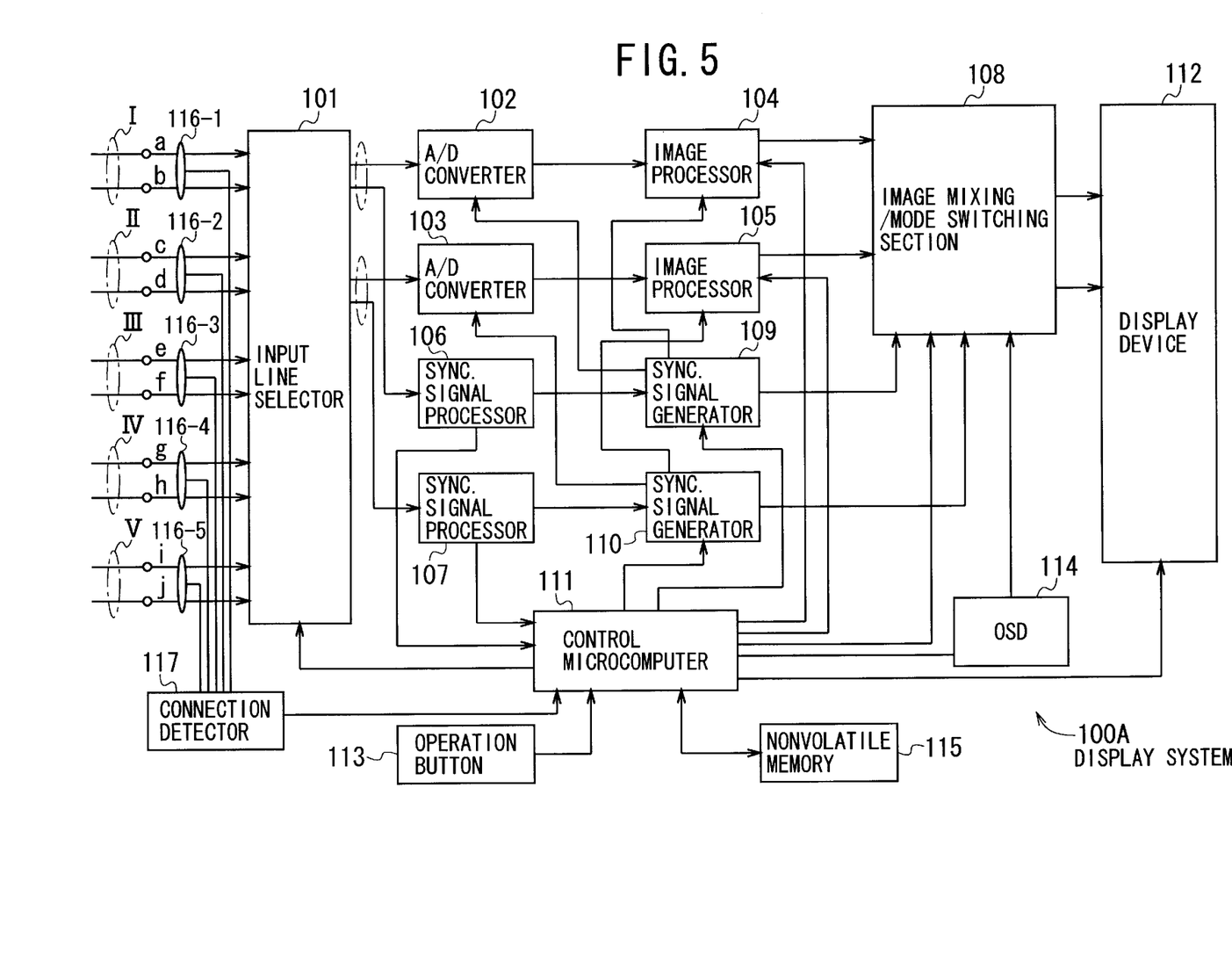
FIG. 5 is a functional block diagram showing the schematic configuration of a display system according to a fourth embodiment of the invention, which corresponds to another concrete example of the second embodiment of FIG. 3.

FIG. 5 shows a display system 100A according to a fourth embodiment of the invention, which corresponds to a variation of the display system 100 according to she third embodiment of FIG. 4 and to another concreted example of the display system 1A according to the second embodiment of FIG. 3.

The system 100A has a configuration obtained by adding five connection detection elements 116-1 to 116-5 and a connection detector 117 to the configuration of tone display system 100 of the third embodiment of FIG. 4. Therefore, the explanation about the same configuration as the system 100 is omitted here for simplification of description.

The connection detection elements 116-1 to 116-5 are provided for the five input lines I to V, respectively. Each of the elements 116-1 to 116-5 outputs a detection result signal to the connection detector 117 when an input device such as a VCR is connected to a corresponding one of the terminal pairs (a, b), (c, d), (e, f), (g, h), and (i, j).

The connection detector 117 receives the detection result signals from the two ones of the five elements 116-1 to 116-5 to which input devices are connected and then, sends the information about the input device connection to the microcomputer 111.

In response to the information about the input device connection from the detector 117, the microcomputer 111 recognizes each input device is connected to which terminal pair (a, b), (c, d), (e, f), (g, h), or (i, j). Then, the microcomputer 111 controls the input line selector 101 according to the result of recognition, thereby determining the video signals for the first and second input lines.

When the operation of the display device 112 is set so as to be automatically switched between the single and dual image modes, for example, the microcomputer 111 conducts its selection operation of the first and second input lines in the following way.

The detection result of each of the elements 116-1 to 116-5 and the order or sequence of connection of the input devices are stored in the internal memory of the microcomputer 111 or the nonvolatile memory 115. The microcomputer 111 reads out the detection result and the order/sequence of connection and as a result, the microcomputer 111 recognizes the terminal pair with the first order of connection as the first input line and the terminal pair with the second order of connection as the second input line. The microcomputer 111 sends the result of recognition thus obtained to the input line selector 101 as the selection condition Based on the selection condition information thus sent, the selector 101 selects two ones of the five input lines I to V. These two lines are automatically determined without any instruction from the user.

The information about whether the switching operation between the single and dual image modes is carried out automatically or manually, and about which one or ones of the five input lines I to V is/are selected and inputted are displayed on the screen of the display device 112. Also, it is preferred to display the information of this type on the OSD 114 by, for example, turning on or off light-emitting elements such as light-emitting diodes (LEDs) and/or by giving different colors to the elements. If so, the user can recognize easily the current operating state of the display system 100A even if the image in the form of menu is not displayed on the screen of the device 112.

As explained above, with the display system 100A according to the fourth embodiment of FIG. 4, because of the same reason as shown in the third embodiment, there are the same advantages as those in the third embodiment.

Variations

It is needless to say that the invention is not limited to the above-described first to fourth embodiments. For example, the operation button 113 may be replaced with a light-receiving element for a remote control unit to control the operation of the display device using infrared radiation or the like. Also, a light-receiving element for a remote control unit may be provided for the operation button 113.

Any communication interface such as RS-232C may be provided to the display system of the invention. In this case, the operation of the system can be controlled easily by way of the communication interface form a remote position.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A display system, comprising:
    (a) a first detector for detecting a synchronizing signal of a first video input sent through a first input line; the first detector outputting a first detection signal when the synchronizing signal of the first video input is detected;
    (b) a second detector for detecting a synchronizing signal of a second video input sent through a second input line; the second detector outputting a second detection signal when the synchronizing signal of the second video input is detected;
    (c) a switch for automatically selecting one of a single image mode and a dual image mode;
    the switch automatically selecting the single image mode when receiving one of the first detection signal outputted from the first detector and the second detection signal outputted from the second detector, thereby producing a first output signal; the first output signal corresponding to the one of the first video input and the second video input received by the switch;
    the switch automatically selecting the dual image mode when receiving both of the first detection signal outputted from the first detector and the second detection signal outputted from the second detector, thereby producing a second output signal; the second output signal corresponding to the both of the first video input and the second video input received by the switch; and
    (d) a display device for displaying an image according to the first output signal on a screen in the single image mode and two images according to the second output signal on the screen in the dual image mode.

2. The system according to claim 1, wherein each of the synchronizing signals of the first and second video inputs is a pulsed signal; and wherein when the pulsed signal is not observed within a specific period of time, each of the first and second detectors judges that each of the first and second video inputs does not include the corresponding synchronizing signal.

3. The system according to claim 1, wherein each of the synchronizing signals of the first and second video inputs is a pulsed signal; and wherein when the pulsed signal observed within a specific period of time has a frequency apart sufficiently from an available frequency of the display device, each of the first and second detectors judges that each of the first and second video inputs does not include the corresponding synchronizing signal.

4. A display system, comprising:
    (a) an input line selector for selecting two of n input lines as a first input line and a second input line, where n is an integer equal to or greater than 3;
    (b) a first detector for detecting a synchronizing signal of a first video input sent through the first input line; the first detector outputting a first detection signal when the synchronizing signal of the first video input is detected;
    (c) a second detector for detecting a synchronizing signal of a second video input sent through the second input line; the second detector outputting a second detection signal when the synchronizing signal of the second video input is detected;
    (d) a switch for automatically selecting one of a single image mode and a dual image mode;
    the switch automatically selecting the single image mode when receiving one of the first detection signal outputted from the first detector and the second detection signal outputted from the second detector, thereby producing a first output signal; the first output signal corresponding to the one of the first video input and the second video input received by the switch;
    the switch automatically selecting the dual image mode when receiving both of the first detection signal outputted from the first detector and the second detection signal outputted from the second detector, thereby producing a second output signal; the second output signal corresponding to the both of the first video input and the second video input received by the switch; and (e) a display device for displaying an image according to the first output signal on a screen in the single image mode and two images according to the second output signal on the screen in the dual image mode.

5. The system according to claim 4, wherein each of the synchronizing signals of the first and second video inputs is a pulsed signal; and wherein when the pulsed signal is not observed within a specific period of time, each of the first and second detectors judges that each of the first and second video inputs does not include the corresponding synchronizing signal.

6. The system according to claim 4, wherein each of the synchronizing signals of the first and second video inputs is a pulsed signal; and wherein when the pulsed signal observed within a specific period of time has a frequency apart sufficiently from an available frequency of the display device, each of the first and second detectors judges that each of the first and second video inputs does not include the corresponding synchronizing signal.

* * * * *